(12) United States Patent  (10) Patent No.: US 8,041,763 B2
Kordun et al.  (45) Date of Patent: Oct. 18, 2011

(54) METHOD AND SYSTEM FOR PROVIDING SHARABLE BOOKMARKING OF WEB PAGES CONSISTING OF DYNAMIC CONTENT

(75) Inventors: Alexander Kordun, Arlington, MA (US); David A. Brooks, Providence, RI (US)

(73) Assignee: International Business Machines Corporation, Armonk, NY (US)

( * ) Notice: Subject to any disclaimer, the term of this patent is extended or adjusted under 35 U.S.C. 154(b) by 535 days.

(21) Appl. No.: 11/761,777

(22) Filed: Jun. 12, 2007

(65) Prior Publication Data

US 2008/0313206 A1  Dec. 18, 2008

(51) Int. Cl.
 G06F 15/16  (2006.01)
 G06F 17/00  (2006.01)
(52) U.S. Cl. ........ 709/203; 709/217; 709/218; 709/219; 715/229; 715/234; 715/241; 715/760
(58) Field of Classification Search .................. 709/218; 707/102
 See application file for complete search history.

(56) References Cited

U.S. PATENT DOCUMENTS

| | | | |
|---|---|---|---|
| 6,535,912 B1 | 3/2003 | Anupam et al. | |
| 6,760,758 B1 | 7/2004 | Lund et al. | |
| 6,976,210 B1 | 12/2005 | Silva et al. | |
| 7,165,220 B1 * | 1/2007 | Bates et al. | 715/738 |
| 2002/0078351 A1 * | 6/2002 | Garib | 713/168 |
| 2002/0112052 A1 * | 8/2002 | Brittingham et al. | 709/224 |
| 2002/0116525 A1 * | 8/2002 | Peters et al. | 709/242 |
| 2003/0009489 A1 * | 1/2003 | Griffin | 707/500 |
| 2003/0090510 A1 | 5/2003 | Shuping et al. | |
| 2003/0144874 A1 * | 7/2003 | Barret et al. | 705/2 |
| 2004/0006605 A1 * | 1/2004 | McCollum et al. | 709/218 |
| 2004/0205511 A1 * | 10/2004 | Best et al. | 715/501.1 |
| 2004/0205574 A1 * | 10/2004 | Sayers et al. | 715/513 |
| 2005/0015491 A1 * | 1/2005 | Koeppel | 709/226 |
| 2005/0034063 A1 * | 2/2005 | Baker et al. | 715/513 |
| 2005/0268243 A1 * | 12/2005 | Moser | 715/760 |
| 2006/0168510 A1 | 7/2006 | Bryar et al. | |
| 2006/0218487 A1 | 9/2006 | Ross et al. | |
| 2008/0027914 A1 * | 1/2008 | Caputo et al. | 707/3 |
| 2008/0201418 A1 * | 8/2008 | Krishnan et al. | 709/204 |

FOREIGN PATENT DOCUMENTS

JP  2004038572 A  2/2004
WO  WO2005009042 A1  1/2005

* cited by examiner

*Primary Examiner* — Ashok B Patel
*Assistant Examiner* — Linglan Edwards
(74) *Attorney, Agent, or Firm* — David A. Dagg

(57) ABSTRACT

A system that automatically obtains Web page-specific scripts to save and restore the state of a Web page. When a user bookmarks or copies a Web page URL to the clipboard, a function is called to create a page state file that is stored together with the current URL to create a bookmark. When the bookmark is loaded or pasted into the location bar of the Web browser, the system reads the URL and page state file, and loads but does not yet display the Web page indicated by the URL of the bookmark. The system then locates the Restore Page State function in the loaded Web page's script, and executes the Restore Page State function on the page state file, resulting in modification to the DOM (Document Object Model) representation of the Web page and display of the Web page to the user based on the modified DOM.

19 Claims, 6 Drawing Sheets

```
function saveState() {
    var state = {};
    state.targetURL = "http://www.xyz.com";

var iframe_link1 = {};
        iframe_link1.href= "http://www.xyz.com/help";
    iframe_link1.name| = "Help page";

state.iframe_window_target= iframe_link1;
    state.menu_visibility=false;
            state.selected_topic="Support";

return state;
```

```
<state version="1.0" xmlns="http://www.w3.org/2006/XMLBookmark">
    <targetURL>http://www.xyz.com</targetURL>
    <iframe_window_target name="Help page">http://www.xyz.com/help</iframe_window_target>
    <menu_visibility>false</menu_visibility>
    <selected_topic>Support</selected_topic>
</state>
```

```
function restoreState(root) {
    var ifr = getElementById("main_iframe");
    var iframe_link = root.iframe_window_target;
    ifr.src = iframe_link.href;
    var ifr_lbl = getElementById("main_iframe_title_div");
    ifr_lbl.innerHTML = iframe_link.name;

var topic_selector = getElementById("topic_selector");
    //call another Javascript funtion, selectTopic(), defined outside the scope of restoreState() elsewhere on the page.
    selectTopic("topic_selector", root.selected_topic);
    var selectTopicBtn = getElementById("select_topic_button");
    selectTopicBtn.className = (state.menu_visibility? "hideButtonCSS" : "showButtonCSS";
```

FIG. 9

METHOD AND SYSTEM FOR PROVIDING SHARABLE BOOKMARKING OF WEB PAGES CONSISTING OF DYNAMIC CONTENT

FIELD OF THE INVENTION

The present invention relates generally to systems for bookmarking Web content, and more specifically to a method and system for providing sharable bookmarking of Web pages consisting of dynamic content.

BACKGROUND OF THE INVENTION

As it is generally known, Internet bookmarks ("bookmarks") are stored Web page locations, typically in the form of Uniform Resource Locators (URLs). Bookmarks are a feature modern Web browsers, and allow convenient cataloging of and access to Web pages. For example, bookmarks are provided through the "Favorites" feature in Microsoft®'s Internet Explorer Web browser. Existing systems have provided bookmark setting and retrieval features in the Web browser user interface. In addition to bookmarking features provided in Web browsers, many external applications exist for bookmark management.

Social bookmarking systems have been developed that allow users to store bookmarks such that they are not tied to one specific computer or Web browser. Web-based bookmarking services enable users to save bookmarks on a remote Web server as part of a structure referred to as a "folksonomy". Such shared bookmarks can then be accessed by all or a group of users. Examples of existing social bookmarking systems include del.icio.us, Google™ bookmarks, Yahoo® Bookmarks and Microsoft Windows® Live Favorites.

With the advent of AJAX (Asynchronous JavaScript and XML) and sophisticated DHTML (Dynamic HTML) techniques to manipulate the Web page content on client computer systems, a significant issue arises with regard to providing stable bookmarkability of content that may be dynamic rather than static during a user session. While a Web page may have a single non-changing URL stored in the Web browser, the content in many Web sites is asynchronously changed and replaced using the widely adopted back-channel communication routine called XMLHttpRequest. Accordingly, when the user sets a bookmark he may only be able to capture the starting URL of the Web site instead of the exact content state he is currently viewing. Users therefore will desire a way to bookmark a dynamic Web page in a way that allows them to restore a specific content state, and to further have the ability to share the bookmark from within the Web browser using simple and familiar cut and paste actions.

Some attempts have been made to address these problems, but have only been partially successful. Applications like Google Maps address Web browser bookmarkability by providing a link on a Web page that the user must click on to manually update the URL stored in the Web browser to a serialized version of the application state. If the user does not click on this link, then later reuse of the URL stored in the Web browser will not reload the expected state. Significant drawbacks of this technique are that it requires that the user be aware of the need to click the link on the page before copying or bookmarking the URL, and that an underlying AJAX/DHTML Web application is able serialize its state into a single URL.

Backbase AJAX Engine (utilized by the Backbase on-line developer forum) is an existing technique that records application state within the Web browser URL without manual intervention by the user. When navigating the Backbase developer forum, the current URL loaded into the Web browser is updated with a hash identifier that represents the current state. For example, the following URL:
http://www.backbase.com/#forum/
messageThread.html%3Fforum=1&thread=1264[4]
indicates that the user is viewing forum 1 and thread 1264. If the above URL is copied and e-mailed to another user, when the other user clicks on the URL the site http://www.backbase.com is loaded into the Web browser, and the AJAX library initialized. On page load, the AJAX library retrieves the hash part of the URL and performs the necessary actions to render the desired state. This solution eliminates the need for manual user intervention, but still requires that the application state be serialized in the URL. As in any solution requiring application state serialization in the URL, sensitive data may be exposed in the resulting URL, even over an HTTPS connection. Additionally, this type of solution is limited by the fact that URLs can only be as large as 2 k characters.

Dojo is a JavaScript library that handles "Back" and "Forward" Web browser button events. Through Dojo intercepting these events, the developer is allowed to specify in JavaScript what the desired action should actually be. One major weakness of this approach is that these functions are in JavaScript, and so the burden of persisting state is on the JavaScript author. If the Web browser leaves the DHTML page, all JavaScript objects are reset when the Web browser returns (i.e. by way of the Back button), and state must therefore be stored elsewhere. In addition, this framework provides minimal assistance for bookmarkability. Dojo allows the developer to specify what value should be put in a hash statement after an AJAX call so the developer can encode application state for later reloading, as in the above described Backbase approach.

The Really Simple History (RSH) framework adds some additional support beyond Dojo by using Web browser forms to address the transient nature of JavaScript objects. This approach provides will persistence when the Web browser navigates away from the application and then back again, but still cannot support cross-browser sessions, sending or saving of bookmarks, or social bookmarking (i.e. del.icio.us).

The AJAX Massive Storage (AMASS) system addresses the cross-browser session limitations of the RSH using a Flash applet to store the hash data, but still does not provide for sharing of bookmarks with others through copy and paste.

For the above reasons and others it would be desirable to have a new system for providing stable bookmarkability of Web pages that addresses the above described shortcomings of existing systems.

SUMMARY OF THE INVENTION

In order to address the above described and other shortcomings of existing systems, a new method and system for providing stable bookmarkability of Web pages is disclosed. The disclosed system provides new capabilities within the Web browser, that automatically obtains Web page author defined, Web page-specific scripts to save and restore the state of a Web page for loading into the Web browser. Using the disclosed system, the Web page author defines within the HTML or associated scripts for the Web page two functions that will generate and take as input an XML state representation of the Web page. In one embodiment, the scripting mechanism used in the Web browser to perform the Save Page State and Restore Page State functions is JavaScript, but the disclosed system is not so limited, and may be embodied using any appropriate scripting language that is interpretable or otherwise processed by a Web browser.

In the disclosed system, when a user bookmarks a Web page, and a Save Page State function is defined for that Web page, the Web browser calls the Save Page State function to create a page state file. The created bookmark file may itself be made up of XML (eXtensible Mark-up Language) code. The page state file is stored with the URL currently loaded into the Web browser to create a bookmark for the Web page.

In the case where a user decides to share the Web page by using a copy and paste operation on the contents of the Web browser location bar, the disclosed system intercepts the copying event and calls the Save Page State function to create the bookmark file. Instead of copying just the URL from the location bar onto the clipboard, the URL and the page state file created by the Save Page State function are both stored on the clipboard for subsequent pasting. If the user pastes the contents of the clipboard into an application that does not understand the page state file, then the URL only is pasted, without the additional state information (i.e. as if the additional state information were not present), thus advantageously providing backwards compatibility.

When a bookmark stored in accordance with the disclosed system is loaded into the location bar of the Web browser, either from a saved bookmark file or the contents of the clipboard, the Web browser reads the URL and page state file. The Web browser then loads but does not yet display the Web page indicated by the URL of the bookmark. The Web browser then locates the definition of the Restore Page State function in the loaded Web page's script, and executes the Restore Page State function on the page state file. If no Restore Page State function definition is found, the Web browser displays the target page in it's initial state. If a Restore Page State function definition is found, then it is executed on the page state file, resulting in modification to the DOM (Document Object Model) representation of the Web page in the Web browser and display of the Web page to the user based on the modified DOM.

In one advantageous aspect of the disclosed system, if the author of the Web page needs to make the page state file securely protected and verifiable, (s)he can generate a digital signature for the file and/or instruct the Web server to generate an encrypted version of it to be downloaded by the Web browser bookmarking the Web page. Logic to perform these steps can be included inside the Save Page State and Restore Page State methods, which can perform such operations either locally on the client system or through the server. A Web browser implementation of such capabilities may in turn support functionality to decrypt/deserialize the bookmark using conventional methods, as well as to verify digital signatures using internal APIs. This capability advantageously helps prevent or discourage the creation of "evil" or "hacked" bookmarks, and/or makes it difficult to steal and change bookmarks to make them malicious without the knowledge of the Web page author. Otherwise, a "malicious", "evil" or "hacked" bookmark may result, which when played back in the Web browser may corrupt the Web page, instruct the browser to load malicious URLs, and/or attempt to steal private information via CSS (Cross Site Scripting) attacks.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

FIG. 7 is a code fragment showing an example of a Save Page State function in an illustrative embodiment of the disclosed system;

FIG. 8 is a code fragment showing an example of a page state file in an illustrative embodiment of the disclosed system; and FIG. 9 is a code fragment showing an example of a Restore Page State function in an illustrative embodiment of the disclosed system.

DETAILED DESCRIPTION OF EXEMPLARY EMBODIMENTS

Figure 1:
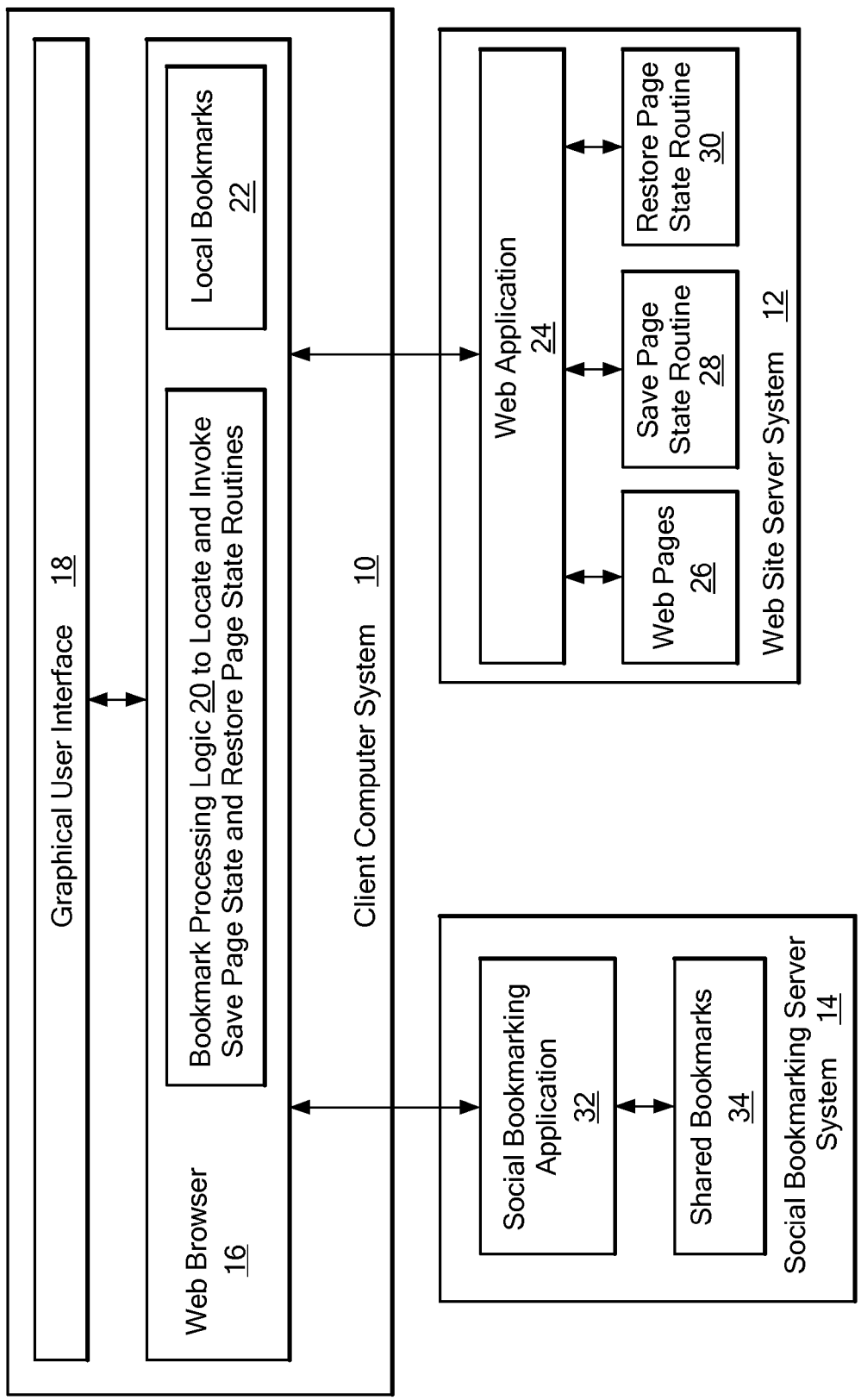
FIG. 1 is a block diagram showing components in an illustrative embodiment of the disclosed system.

FIG. 1 is a block diagram showing components in an illustrative embodiment of the disclosed system. As shown in FIG. 1, a Client Computer System 10 includes a Web Browser 16, which provides a Graphical User Interface 18 to a local user of the Client Computer System 10. The Web Browser 16 is shown including Bookmark Processing Logic 20 for locating and invoking Sage Page State and Restore Page State routines during the creation and restoration of bookmarks. The Web Browser 16 is further shown containing a number of Local Bookmarks 22.

A Web Site Server System 12 is shown including a Web Application 24, which has access to a number of Web Pages 26, a Save Page State Routine 28, and a Restore Page State Routine 30. A Social Bookmarking Server System 14 is shown including a Social Bookmarking Server System 14 is shown including a Social Bookmarking Application 32, which has access to a number of Shared Bookmarks 34.

During operation of the illustrative embodiment shown in FIG. 1, the Web Browser 16 operates to define and store the Local Bookmarks 22, as well as one or more of the Shared Bookmarks 34, on behalf of a local user of the Client Computer System 10. One or more display objects, such as buttons, menus, etc. are provided by the Web Browser 16 in the Graphical User Interface 18 for this purpose.

The Bookmark Processing Logic 20 uses a Save Page State routine associated with a Web page to create a bookmark for that Web page to be stored into either the Local Bookmarks 22 or Shared Bookmarks 34. For example, the Bookmark Processing Logic 20 determines a Save Page State routine (if available) to be used to save the current page state of a Web page that is being bookmarked into a corresponding bookmark. The page state generated using the Save Page State routine for the Web page is then stored with a link to the page in a resulting bookmark.

The Bookmark Processing Logic 20 further determines a Restore Page State routine (if available) to be used to restore the page state of a Web page that has previously been bookmarked. For example, when the local user requests a Web page indicated by a previously stored bookmark, the Bookmark Processing Logic 20 determines a Restore Page State routine (if available) to be used to restore the page state of a Web page that is indicated by a link within the bookmark. The requested Web page is then displayed in the state defined by the result of executing the Restore Page State routine.

For example, in the case where the Web Application 24 provides one of the Web Pages 26 to the Web Browser 16, that Web page may include an indicator of (i.e. link or pointer to) the Save Page State Routine 28, which is to be used by the Bookmark Processing Logic 20 create a page state file to be included in a bookmark for that Web page. A Web page provided by the Web Application 24 from the Web Pages 26 may further include an indicator of (i.e. link or pointer to) the Restore Page State Routine 30, which is to be used by the Bookmark Processing Logic 20 restore that Web page based on the contents of a page state file contained in a previously made bookmark for the Web page. In one embodiment, the Save Page State Routine 28 and Restore Page State Routine 30 are indicated for all Web pages (e.g. Web Pages 26) that are provided to users by the Web Application 24. Accordingly, in such an embodiment, the specific operation of a Save Page State routine (e.g. Save Page State routine 28), as well as the specific format and meaning of a page state file created therefrom, need only be understood by the corresponding Restore Page State routine (e.g. Restore Page State Routine 30) for a given Web site (e.g. the Web site provided by the Web Application 24 on Web Site Server System 12).

The Client Computer System 10 may be embodied as any specific type of client computer system or electronic device operable to provide a graphical user interface to a user. Such systems may, for example, include desktop, laptop, palm top, or tablet computer systems, personal digital assistants (PDAs), cell phones, and the like. Accordingly, the Client Computer System 10 may be embodied to include one or more processors, memory for storing program code executable on such processor and associated data, and one or more input/output devices or interfaces. The Client Computer System 10 may further include any appropriate operating system software.

The Web Browser 16 may, for example, be embodied as application program code executing on one or more processors in the Client Computer System 10, digital hardware logic (e.g. ASICs or the like), or some combination of software, firmware and/or hardware. The Graphical User Interface 18 may be provided through any specific type of display device included in or attached to the Client Computer System 10.

The server computer systems 12 and 14 may be embodied as any specific type of computer system including one or more processors, memory for storing program code executable on such processor and associated data, and one or more input/output devices or interfaces. The Social Bookmarking Application 32 and Web Application 24 may be embodied as application program code, digital hardware logic (e.g. ASICs or the like), or some combination of software, firmware, and/or hardware. The server computer systems 12 and 14 may each further include any appropriate operating system software.

The Client Computer System 10, Web Site Server System 12, and Social Bookmarking Server System 14 are communicably connected through one or more communication networks, such as a Local Area Network (LAN), the Internet, and/or another specific type of communication network.

Figure 2:
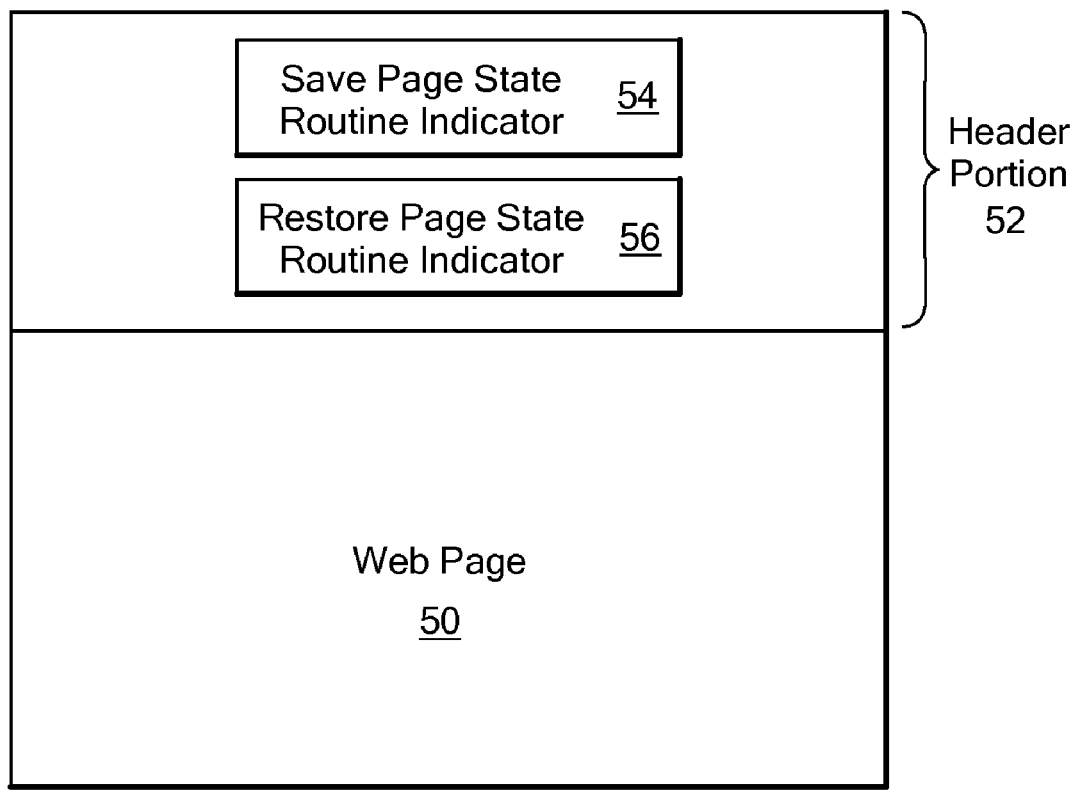
FIG. 2 is a block diagram showing the logical structure of a Web page in an illustrative embodiment.

FIG. 2 is a block diagram showing the logical structure of a Web page in an illustrative embodiment. As shown in FIG. 2, a Web Page 50 in an embodiment of the disclosed system includes a Save Page State Routine Indicator 54, storing a link or pointer to a Save Page State routine to be used when creating a bookmark for the Web Page 50. The Web Page 50 is further shown including a Restore Page State Routine Indicator 56, storing a link or pointer to a Restore Page State routine to be used when loading a page indicated by a bookmark created using the Save Page State routine indicated by the Save Page State Routine Indicator 54. In the embodiment of FIG. 2, the Save Page State Routine Indicator 54 and Restore Page State Routine Indicator 56 are located within a Header Portion 52 of the Web Page 50.

In an alternative embodiment, the associated Save Page State and/or Restore Page State routine code for bookmark processing related to a given Web page may itself be stored within the header or some other portion of the Web page itself.

Figure 3:
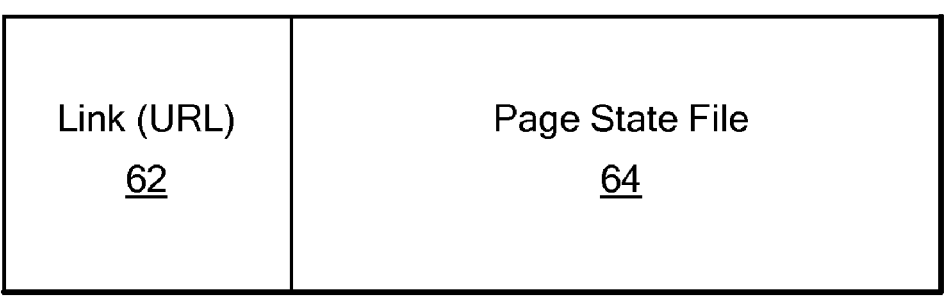
FIG. 3 is a block diagram showing a logical structure of a bookmark in an illustrative embodiment.

FIG. 3 is a block diagram showing a logical structure of a bookmark in an illustrative embodiment. As shown in FIG. 3, a bookmark 60 includes a Link (URL) 62 and a Page State File 64. While the Link 62 and Page State File 64 are shown separately in the illustrative bookmark 60 of FIG. 3, the Link 62 may alternatively be stored within the Page State File 64. The Page State File 64 may, for example, be made up of XML code.

The Page State File 64 may further include a digital signature or the like associated with and operable to authenticate the source of the Page State File 64 by an associated Restore Page State routine. For example, in the case of a Web site that provides a Save Page State routine to be used to bookmark Web Pages in the site, the Save Page State routine may operate to digitally sign the Page State File 64. Accordingly, in such an embodiment, when the Restore Page State routine from that Web site is used to process the bookmark 60 to restore the Web page, the Restore Page State routine can authenticate the Page State File 64 to ensure that it is from a trusted source (i.e. the Save Page State routine of that Web site), and has not been modified since it was created by the trusted source. This prevents attacks based on fraudulent Page State File contents created by malicious entities.

Similarly, the Page State File 64 may be encrypted when created by a Save Page State routine so that only an associated Restore Page State routine can decrypt its contents. For example, in the case of a Web site that provides a Save Page State routine to be used to bookmark Web Pages in the site, the Save Page State routine may operate to encrypt the Page State File 64. Accordingly, in such an embodiment, only the Restore Page State routine from that Web site can be used to process the resulting bookmark 60, since only that Restore Page State routine can decrypt the Page State File 64. This prevents unauthorized access to the contents of the Page State File 64.

Figure 4:
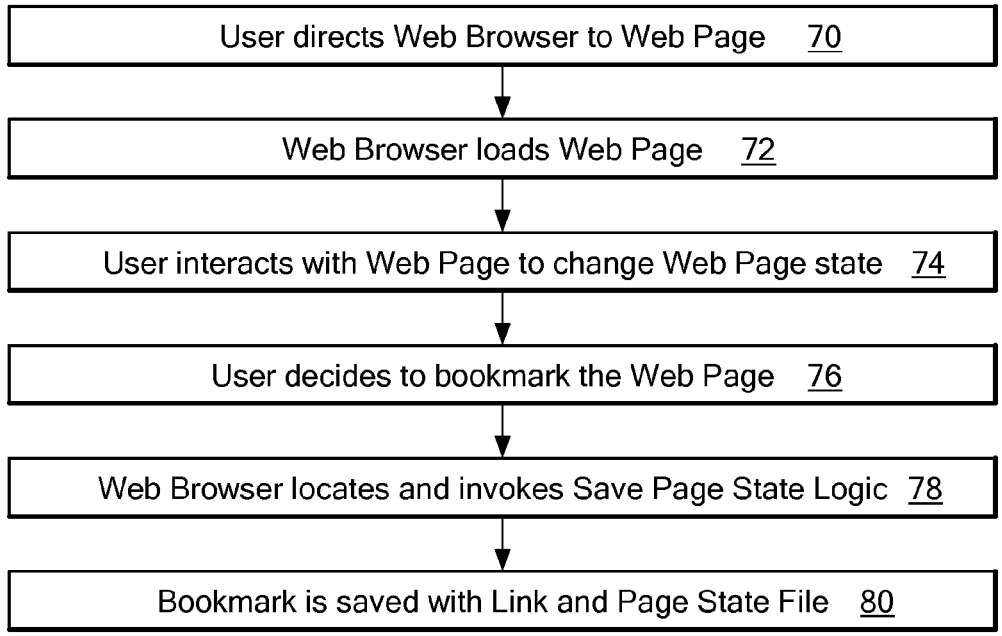
FIG. 4 is a flow chart showing steps performed to create a bookmark in an illustrative embodiment of the disclosed system.

FIG. 4 is a flow chart showing steps performed to create a bookmark in an illustrative embodiment of the disclosed system. At step 70, a user directs the Web browser to a target Web page, for example by clicking on an existing link or typing the address into the location bar and pressing enter. At step 72 the Web browser loads the page for the user. The Web page may define script Save Page State and Restore Page State functions, e.g. saveState( ) and restoreState( ), for example referring to such functions in its HTML header, e.g. <head importState="restoreState( )" exportState="saveState( )"/>.

At step 74 the user interacts with the Web page, changing the current state of the Web page. For example, the user interacts with the Web page at step 74 such that changes are made to the Web page's DOM representation. Such changes, may for example, include loading child pages in the iframes, making XMLHttpRequest calls to update the DOM asynchronously, calling local script functions to modify the DOM directly or via CSS (Cascading Style Sheets), and/or other state changes. For example, state changes occurring at step 74, and captured by a bookmark of the disclosed system, might include state changes caused when a user goes to a Web site and clicks on a graphical button or the like, which changes a state in the initial page representation from "Enabled" to "Disabled". Similarly, the user might perform an action at step 74, such as selecting a topic in a discussion forum, that loads a different HTML page into the IFRAME of the current Web page. The address of the page loaded into the IFRAME would be stored in a bookmark of the disclosed system, so that for a subsequent visit to the bookmarked page through the stored bookmark, the page loaded into the IFRAME in the previous visit can be displayed immediately upon selection of the bookmark by the user.

At step 76, the user decides to bookmark the Web page in its modified state. For example, the user may navigate to or select an appropriate bookmarking user interface control in the Web browser graphical user interface, e.g. by clicking on a "Bookmark this" or "Save as bookmark" user interface command. The user may further enter metadata at step 76 to be associated with the stored bookmark, as is conventional in Web browsers and/or social bookmarking systems.

At step 78, the Web browser locates and invokes the appropriate Save Page State routine. For example, if the "saveState( )" function is defined in script and referenced in the header in step 72, the Web browser calls the "saveState( )" function, which executes and creates an XML Page State File that either is or is at least a part of the created bookmark. For example, the created bookmark may include the link to the Web page as currently stored in the Web browser location bar in addition to the XML Page State File, or, alternatively, the Page State File itself may include the link to the Web page from the Web browser location bar and make up the bookmark itself. The resulting bookmark is then stored at step 80, for example in a local or remote file system for bookmarks that are either local or shared.

Figure 5:
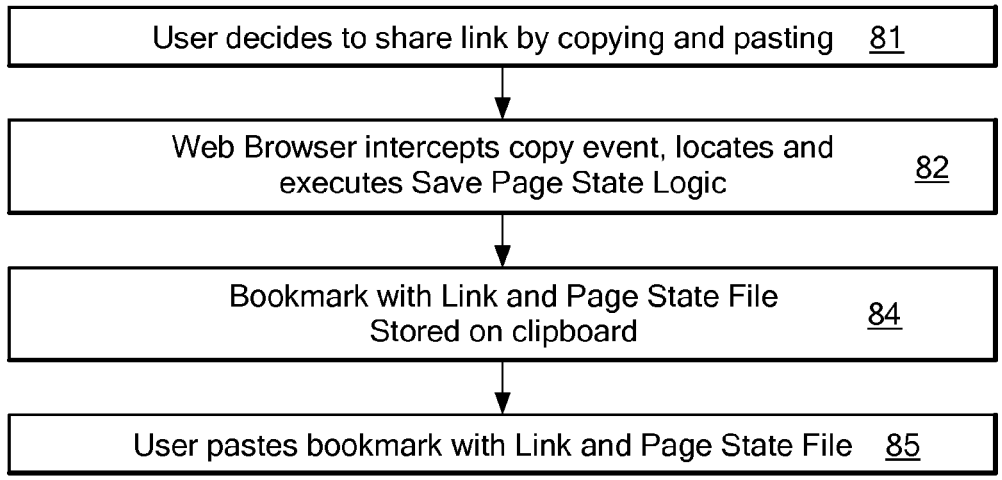
FIG. 5 is a flow chart showing steps performed to cut and paste a link in an illustrative embodiment of the disclosed system.

FIG. 5 is a flow chart showing steps performed to cut and paste a link in an illustrative embodiment of the disclosed system. At step 81 the user decides to share a link to a Web page currently loaded the Web browser by copying and pasting the link from the location bar of the Web browser. For example, the user uses the copy and paste utility provided on the user's virtual desktop provided by the underlying operating system, through which a portion of content can be copied onto a virtual clipboard and then pasted into another application. Accordingly, in such a case, the user selects the URL in the location bar, and copies it, e.g. by pressing Cntrl-C or activating the context menu having the Copy option. This action puts the bookmark onto the virtual clipboard, from which it can be pasted into any other application (e.g. another Web site, e-mail message, chat window, etc), for example in order to share the bookmark with a community of users.

At step 82 the Web browser intercepts the copying event and performs several actions. First, instead of just putting the URL string onto the clipboard, the Web browser executes the "saveState( )" function for the currently loaded Web page (if such a function is defined on the page), and puts the resulting XML Page State File onto clipboard, either including or in addition to the URL of the Web page. In the case where the user has already gone through the bookmarking process shown in FIG. 4, the Web browser locates the existing Page State File instead of re-executing the saveState( ) function. At step 85, the user pastes the bookmark including the link and Page State File into an application, e.g. in order to share the bookmark with the community. If the user pastes the bookmark into an application that does not understand the meaning of the Page State File (e.g. Notepad), then the URL only is pasted, without the additional state information (i.e. as if the additional state information were not present), thus advantageously providing backwards compatibility. If the application into which the bookmark is pasted does understand the meaning of the Page State File (i.e. can locate the appropriate Restore Page State function to process the Page State File), then the Page State File is processed in order to restore the bookmarked Web page to the state it was in when it was originally bookmarked.

Figure 6:
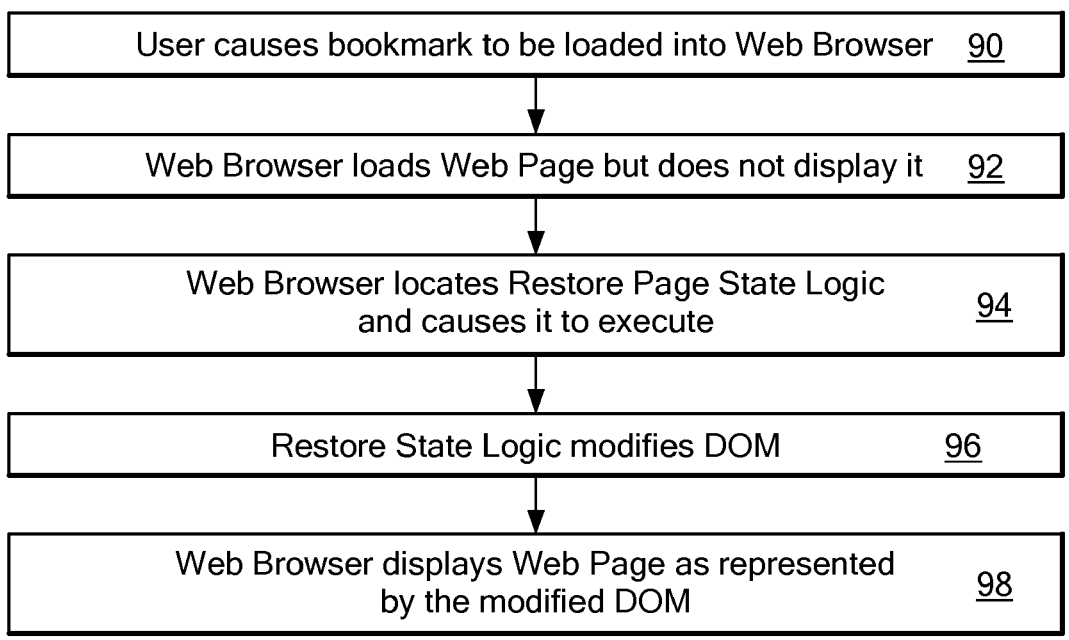
FIG. 6 is a flow chart showing steps performed to process a bookmark in an illustrative embodiment of the disclosed system.

FIG. 6 is a flow chart showing steps performed to process a bookmark in an illustrative embodiment of the disclosed system. At step 90, the user initiates loading a bookmark in accordance with the disclosed system into the Web browser. For example, the user may have access to the XML Page State File for the bookmark as generated by the Web browser in accordance with the steps of FIG. 4. The user may have selected the bookmark from a bookmark menu in the Web browser user interface, or has either copied the file as an entity of the file system, or simply placed the contents of the bookmark including the XML Page State File onto the clipboard via an operating system utility. The user further brings up a Web browser window, focuses on the location bar, and executes a paste operation.

At step 92 the Web browser reads the bookmark having the XML Page State File, determines the target URL for the Web page, and loads that page into the browser, but does not display it in the graphical user interface to the user. In other words, the Web browser sets up the DOM as it would look at an initial visit, but waits to see if the state needs to be changed before displaying the Web page to the user. In the steps that follow, if the stored state and associated state restoration function are located, then the DOM is changed based on the stored state using the restoration function. Otherwise, the browser just displays the Web page using the initial page state DOM.

At step 94 the Web browser locates the definition of the "restoreState( )" function in the Web page's script, and executes it on the XML Page State File of the bookmark. If no "restoreState" function definition is found, no state restoration is performed and the Web page is displayed to the user in it's initial state.

At step 96 execution of the "restoreState" function modifies the Web page DOM representation based on the state information in XML Page State File in the bookmark, and the resulting representation of the bookmarked Web page is displayed to the user at step 98.

FIGS. 7-9 illustrate examples of Save Page State and Restore Page State functions in an embodiment of the disclosed system for a dynamic Web site, and the resulting XML snippet that would be persisted by the Web browser in a bookmark when a user follows the workflows described above. FIG. 7 is a code fragment showing an example of a Save Page State function 110 in an illustrative embodiment of the disclosed system. In the example of FIG. 7, the Save Page State function 110 is a callback "saveState" function that creates a JavaScript associative array object (JSON format) that is a list of state properties. When the Web browser executes the function 110 it converts JSON into the XML bookmark and saves it for the user.

FIG. 8 is a code fragment 120 showing an example of a Page State File in an illustrative embodiment of a bookmark of the disclosed system.

FIG. 9 is a code fragment 130 showing an example of a Restore Page State function in an illustrative embodiment of the disclosed system. In the example of FIG. 9, the Restore Page State function 130 is a callback "restoreState" function in which "root" is equal to "state". The Web browser converts the XML bookmark into a JSON representation of an associative array variable called "state".

The disclosed system may be embodied to operate in and/or with various specific Web Browsers, including but not limited to Internet Explorer provided by Microsoft® and Firefox provided by Mozilla. In Internet Explorer, the action of bookmarking a page creates a file on the file system known as a "shortcut". The contents of this shortcut represents the URL of the bookmarked page, plus some additional parameters retrieved by the Web browser. For example:

```
[DEFAULT]
BASEURL=http://www.xyz.com/
[InternetShortcut]
URL=http://www.google.com/
Modified=50F98F560373C6016B
IconFile=http://www.xyz.com/favicon.ico
IconIndex=1
```

Any content that follows these entries is currently ignored by the Web browser.

In an Firefox, the Web browser persists bookmarks in a single bookmarks.html file. This file conforms to the Netscape Bookmark File Format, the same format that is used for bookmark exchange between most Web browsers (export/import). The syntax is HTML with additional semantic meaning. The HTML file must start with:
<!DOCTYPE NETSCAPE-Bookmark-file-1>
Folders are represented by:

```
<DT><h3 .... optional params like date, icon, etc. ........> TITLE </h3>
<DL><p>
   <bookmark items>
</DL><p>
</DT>
```

Bookmarks are represented as:

```
<DT><A ... optional params like date, icon, etc, ....> Title </A>
Descriptions (optional) are represented as:
<DD>description text</DD>
and can be nested within any <DT> element
```

Both of the above formats support additional content additions without impacting backwards comparability, and that could be recognized going forward by enhanced Web browsers. Internet Explorer would support additional XML markup at the bottom of each individual text file. This markup is ignored by existing Web browsers. Firefox, using the Netscape format, could be extended to have a <STATE> tag with a display attribute set to "none" and the value being the escaped markup. This would be nested in any <DT> element that represents a bookmark. When a user performs an action that should generate a persistent bookmark entry (i.e. favorites, copy URL, etc.) the "saveState" method in the header is executed and allows the page to serialize its state in XML markup into one of the formats described above. At the time of invoking a bookmark in a Web browser, the page is loaded followed by an invocation of "loadState" which is passed the stored XML markup.

The disclosed system enables the author of a Web page to make the Page State File generated for that page securely protected (i.e. encrypted) and verifiable (i.e. digitally signed). The Web page author may provide Save Page State function that generates a digital signature for the Page State File, and/or instructs the Web page server to generate an encrypted version of the Page State File to be downloaded by the Web browser bookmarking the Web page. Encryption and/or authentication functions may be included in the Save Page State and Restore Page State functions, these operations can be performed either locally on the client system, or partly or completely on the Web page server. A Web browser implementation of these capabilities may in turn support functionality to decrypt/deserialize the bookmark based on conventional techniques, as well as verifying digital signatures using it's internal APIs. This capability should help prevent or discourage the creation of "evil" or "hacked" bookmarks, and/or make it difficult for people to steal and change bookmarks to make them malicious without the knowledge of the Web page author. This is a significant feature of the disclosed system, since a "malicious", "evil" or "hacked" bookmark is one that when restored in the Web browser may corrupt the Web page, instruct the browser to load malicious URLs, or attempt to steal private information via CSS (cross site scripting) attacks.

As described herein, a bookmark in the disclosed system contains the initial URL and state information to be used to restore the state of the bookmarked page when the page is loaded, using an identified page state restoring function. The complete bookmark of the disclosed system may be represented in XML. Alternatively, in another embodiment, the URL of the bookmark is not contained within the XML in the bookmark. In either case, the state information of the bookmark may be represented in XML format within a bookmark file. In the case where only the state information is stored in XML, Web page authors are advantageously allowed to create bookmarks with proprietary XML schemas that only their Web site understands. In the case where both the state information and the URL are contained in the XML of the bookmark file, a conventional/standard schema may advantageously be applied across all sites.

The disclosed system can take the form of an entirely software embodiment, an entirely hardware embodiment, or an embodiment containing both software and hardware elements. The figures include block diagram and flowchart illustrations of methods, apparatus(s) and computer program products according to an embodiment of the invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed.

We claim:

1. A method embodied in a computer system, said computer system including at least one processor and at least one computer readable memory, for providing stable bookmarking of Web pages, comprising:
    determining, by a Web browser executing in said computer system, in response to detecting a save bookmark event, a save page state routine associated with a Web page that is currently loaded into said Web browser, said save page state routine for saving a current state of said Web page in response to said detecting of said save bookmark event, wherein said determining includes said Web browser finding a reference to said save page state routine in said Web page and downloading said save page state routine from a Web site containing said Web page;
    invoking, by said Web browser, said save page state routine to create a page state file containing a representation of said current state of said Web page; and
    storing said page state file together with a link to said Web page as a bookmark for said Web page.

2. The method of claim 1, wherein said link to said Web page comprises a Uniform Resource Locator (URL).

3. The method of claim 1, wherein said page state file comprises extensible mark-up language (XML) code.

4. The method of claim 1, wherein said save bookmark event comprises a user request to store a bookmark for said Web page.

5. The method of claim 1, wherein said save bookmark event comprises a copy operation performed on said link to said Web page from a location bar of said Web browser.

6. The method of claim 5, wherein said storing of said page state file together with said link to said Web page as a bookmark for said Web page comprises storing said page state file together with said link to said Web page into a software clipboard for subsequent paste operations.

7. The method of claim 1, wherein said determining said a save page state routine associated with said Web page currently loaded into said Web browser comprises:
    finding said reference to said save page state routine in a header portion of said Web page.

8. The method of claim 7, wherein said save page state routine comprises JavaScript code.

9. The method of claim 1, further comprising:
    detecting that said bookmark for said Web page has been loaded into said Web browser in response to a restore bookmark event;
    loading said Web page into said Web browser based on said link in said bookmark but without initially displaying said Web page to a user;
    determining a restore page state routine associated with said Web page, said restore page state routine for restoring a previous state of said Web page in response to said detecting that said bookmark for said Web page has been loaded into said Web browser, wherein said determining includes finding a reference to said restore page state routine in said Web page and downloading said restore page state routine from a Web site containing said Web page;
    invoking, by said Web browser, said restore page state routine with said page state file as an input to said restore page state routine; and
    upon completion of said restore page state routine, displaying said Web page to said user.

10. The method of claim 9, wherein said restore bookmark event comprises a user request to restore said Web page through a representation of said bookmark to said user.

11. The method of claim 9, wherein said restore bookmark event comprises a paste operation performed on said bookmark from said software clipboard into said location bar of said Web browser.

12. The method of claim 9, wherein said determining said a restore page state routine associated with said Web page comprises:
    finding said reference to said restore page state routine in a header portion of said Web page.

13. The method of claim 12, wherein said save page state routine comprises JavaScript code.

14. The method of claim 9, further comprising:
    wherein execution of said restore page state routine modifies a document object model representation of said Web page in said Web browser in response to contents of said page state file; and
    wherein said modification of said document object model changes a visual representation of said Web page from an initial representation of said Web page.

15. The method of claim 9, further comprising:
    detecting that a second bookmark for a second Web page has been loaded into said Web browser in response to a second restore bookmark event;
    determining that said second bookmark does not include a page state file; and
    displaying said second Web page in an initial state responsive to a link in said bookmark for said second Web page without invoking any restore page state routine.

16. The method of claim 9, further comprising:
    wherein said save page state routine encrypts said page state file such that only said restore page state routine can decrypt said page state file.

17. The method of claim 9, further comprising:
    wherein said save page state routine digitally signs said page state file such that said restore page state routine can authenticate said page state file as being created by said save page state routine and not modified since being created by said save page state routine.

18. A computer system for providing stable bookmarking of Web pages, said computer system including at least one computer readable memory for storing program code executable on at least one processor in said computer system, said program code stored on said computer readable memory operable, when executed to cause said computer system to:
    determine, by a Web browser executing in said computer system, in response to detecting a save bookmark event, a save page state routine associated with a Web page that is currently loaded into said Web browser, said save page state routine for saving a current state of said Web page in response to said detecting of said save bookmark event, wherein said determination of said save page state routine associated with said Web page that is currently loaded into said Web browser includes said Web browser finding a reference to said save page state routine in said Web page and downloading said save page state routine from a Web site containing said Web page;

invoke, by said Web browser, said save page state routine to create a page state file containing a representation of a current state of said Web page; and store said page state file together with a link to said Web page as a bookmark for said Web page.

19. A computer program product including a non-transitory computer readable storage medium, said non-transitory computer readable storage medium having program code stored thereon for providing stable bookmarking of Web pages, said program code comprising:

program code for determining, by a Web browser executing in a computer system, in response to detecting a save bookmark event, a save page state routine associated with said Web page that is currently loaded into a Web browser, said save page state routine for saving a current state of said Web page in response to said detecting of said save bookmark event, wherein said determining includes said Web browser finding a reference to said save page state routine in said Web page and downloading said save page state routine from a Web site containing said Web page;

program code for invoking, by said Web browser, said save page state routine to create a page state file containing a representation of a current state of said Web page; and program code for storing said page state file together with a link to said Web page as a bookmark for said Web page.

* * * * *